United States Patent [19]

Clark et al.

[11] Patent Number: 5,083,611

[45] Date of Patent: Jan. 28, 1992

[54] NUTRIENT INJECTION METHOD FOR SUBTERRANEAN MICROBIAL PROCESSES

[75] Inventors: James B. Clark; Gary E. Jenneman, both of Bartlesville, Okla.

[73] Assignee: Phillips Petroleum Company, Bartlesville, Okla.

[21] Appl. No.: 643,562

[22] Filed: Jan. 18, 1991

[51] Int. Cl.$^5$ ............................................. E21B 43/22
[52] U.S. Cl. .................................... 166/246; 166/250; 166/294
[58] Field of Search ............... 166/246, 250, 252, 292, 166/294, 305.1; 435/243, 252.1, 281; 210/170, 747

[56] References Cited

U.S. PATENT DOCUMENTS

| | | | |
|---|---|---|---|
| 3,032,472 | 5/1962 | Hitzman | 195/3 |
| 4,450,908 | 5/1984 | Hitzman | 166/273 |
| 4,460,043 | 7/1984 | Thompson et al. | 166/246 |
| 4,475,590 | 10/1984 | Brown | 166/246 |
| 4,522,261 | 6/1985 | McInerney et al. | 166/246 |
| 4,558,739 | 12/1985 | McInerney et al. | 166/246 |
| 4,799,545 | 1/1989 | Silver et al. | 166/246 |
| 4,800,959 | 1/1989 | Costerton et al. | 166/246 |
| 4,905,761 | 3/1990 | Bryant | 166/246 |
| 4,906,575 | 3/1990 | Silver et al. | 435/253 |
| 4,947,932 | 8/1990 | Silver et al. | 166/246 |
| 4,971,151 | 11/1990 | Sheehy | 166/246 |

FOREIGN PATENT DOCUMENTS

WO8910463 11/1989 PCT Int'l Appl. .

*Primary Examiner*—George A. Suchfield
*Attorney, Agent, or Firm*—Laney, Dougherty, Hessin & Beavers

[57] ABSTRACT

The present invention provides a method of injecting nutrients into a subterranean formation in order to achieve a desired in-situ microbial objective. Sources of individual nutrient components which are deficient in the formation are sequentially injected so that a complete nutrient medium capable of sustaining substantial microbial activity is formed in the formation upon injection of the last of said sources. Said sources are preferably injected into the formation in order of decreasing quantitative formation retainability.

24 Claims, No Drawings

NUTRIENT INJECTION METHOD FOR SUBTERRANEAN MICROBIAL PROCESSES

BACKGROUND OF THE INVENTION

1. Field of the Invention

In one aspect, the present invention relates to nutrient injection methods for subterranean microbial processes. In another aspect, the present invention relates to nutrient injection methods for microbial enhanced oil recovery (MEOR). In another aspect, the present invention relates to nutrient injection methods for microbially altering the permeability of subterranean formations.

2. Description of the Prior Art

Various MEOR techniques have been used to provide enhanced oil recovery from oil-bearing subterranean formations. For example, microorganisms have been used in oil-bearing subterranean formations to: produce $CO_2$ which dissolves in and reduces the viscosity of the oil in the formation; produce organic acids within the formation which dissolve cementing materials and thereby create flow passages within the formation; produce surfactants which operate to reduce interfacial tension between the oil and the rock of the formation; produce solvents, such as ethanol and acetone, within the formation; produce water-soluble polymers within the formation; and/or physically displace oil adhering to sand particles within the formation. Microorganisms have also been used to plug high permeability zones within subterranean formations. This plugging results from in-situ biomass production (i.e., microbial growth and/or expolymer production). Once the high permeability formation zones are plugged, subsequently injected water and/or polymer floods are caused to flow through oil-rich lower permeability zones.

Numerous microorganisms suitable for achieving various microbial objectives in subterranean formations are known in the art. In order to achieve a specific microbial objective, suitable microorganisms can be selected and injected into the subterranean formation. Oftentimes, however, endogenous microorganisms well suited for achieving a particular microbial objective are already present within the formation.

Although nutrient injection is a critical aspect in the activation and control of many subterranean microbial processes, various problems have plagued nutrient injection methods used heretofore. One problem has involved the excessive utilization and depletion of nutrients by microorganisms located at or near the injection borehole. Excessive utilization and depletion of nutrients by microorganisms located in the vicinity of the borehole operates to prevent indepth nutrient distribution and creates excessive plugging in the vicinity of the borehole (i.e., face plugging). Additionally, differential chromatographic retention of individual nutrient components within subterranean formations operates to prevent indepth distribution of complete growth mediums. Differential chromatographic retention of the individual nutrient components results in the development of an incomplete growth medium at some point in the formation. In many formations, differential chromatographic retention prevents the distribution of a complete nutrient medium beyond the proximity of the borehole.

Many of the nutrient injection methods used heretofore have also been susceptible to microbial contamination problems. When a complete nutrient medium capable of supporting microbial activity is present above ground, microbial cells present in the above ground environment can collect and thrive in the nutrient medium. Thus, measures must be taken above ground to maintain the sterility of the nutrient medium. Adequate sterility measures can be difficult and costly, particularly when a large amount of nutrient medium is involved.

Thus, a need exists for a nutrient injection method which addresses these problems.

SUMMARY OF THE INVENTION

The present invention provides a method of injecting microbial nutrients into a subterranean formation in order to achieve a desired in-situ microbial objective. In the inventive method, sources of individual nutrient components which are deficient in the subterranean formation are sequentially injected into the subterranean formation so that a complete nutrient medium capable of sustaining substantial microbial activity is formed in the formation upon injection of the last nutrient source. Each of the nutrient sources is comprised of at least one of the deficient individual nutrient components. Further, each of the nutrient sources, up to and including the next to the last nutrient source injected, is injected in an amount such that the at least one individual nutrient component contained therein is retained in the subterranean formation in an amount sufficient for achieving the desired in-situ microbial objective.

The nutrient sources selected for use in the inventive method are preferably injected into the subterranean formation in order of decreasing quantitative formation retainability. Thus, the selected nutrient source which is most readily retained in the formation is preferably injected first and the selected nutrient source which is least readily retained in the formation is preferably injected last.

The inventive nutrient injection method described herein addresses each of the problems discussed above. The inventive method prevents the excessive utilization and depletion of nutrient components by microorganisms located in the vicinity of the borehole. Further, the inventive method takes advantage of chromatographic retention in order to achieve nutrient media distribution beyond the proximity of the borehole. Finally, since none of the nutrient sources used in the inventive method contains a complete nutrient medium capable of sustaining substantial microbial activity, the inventive method eliminates the need for costly aboveground sterility maintenance procedures.

Further objects, features, and advantages of the present invention will readily appear to those skilled in the art upon reading the following description of the preferred embodiments.

DESCRIPTION OF THE PREFERRED EMBODIMENTS

The inventive nutrient injection method disclosed herein can generally be used in conjunction with any process wherein microbial activity is induced in a subterranean rock matrix or similar adsorbing complex. Examples of such processes include MEOR processes used in oil-bearing subterranean formations and bioremediation processes used in aquifers. Typical MEOR processes include those wherein microorganisms are used to alter subterranean formation permeability and those wherein microorganisms are used for in-situ generation of chemicals useful for enhanced oil recovery. Examples of in-situ generated chemicals include water-soluble polymers, surfactants, solvents such as ethanol and acetone, acids, carbon dioxide, etc.

The inventive method is particularly well suited for use in conjunction with MEOR processes for altering the permeability of subterranean formations. In these MEOR processes, nutrients are fed to microorganisms located in high permeability formation zones. The nutrients stimulate the microorganisms and cause the microorganisms to generate an increased biomass. This increased biomass results from cell growth and/or the biological production of polymer(s). Once the high permeability formation zones have been plugged, later injected water and/or polymer floods are caused to flow through previously uninvaded low permeability zones and thereby displace oil contained in the low permeability zones.

The microorganisms used in conjunction with the inventive method can be selected for the attainment of a desired microbial objective and then injected into the subterranean formation. Preferably, such microorganisms are injected into the formation prior to nutrient injection. As is known in the art, the particular microorganisms chosen for injection should be tolerant of the conditions, e.g., temperature, pH, chemical environment, etc., existing in the formation. Table I provides examples of typical microorganisms useful in various MEOR processes.

TABLE I

EXAMPLES OF MICROORGANISMS USEFUL IN MEOR PROCESSES

| BACTERIA | MEOR OBJECTIVE |
| --- | --- |
| Clostridium acetobutylicum[1] | in-situ production of solvents and gases |
| Bacillus licheniformis JF-2[2] | in-situ production of biosurfactant |
| Leuconostoc dextranicus[3] | in-situ production of biopolymer |
| Bacillus licheniformis JF-2 and Clostridium acetobutylicum blend[4] | in-situ production of solvent and biosurfactant |

[1] H. F. Yarbrough and V. F. Coty, Proceedings of the 1982 International Conference on Microbial Enhancement of Oil Recovery, Afton, Oklahoma, May 16-21, U.S.D.O.E. Conf. 8205140, published 1983, pages 149-153, the entire disclosure of which is incorporated herein by reference.
[2] U.S. Pat. No. 4,522,261, the entire disclosure of which is incorporated herein by reference.
[3] U.S. Pat. No. 4,460,043, the entire disclosure of which is incorporated herein by reference.
[4] U.S. Pat. No. 4,905,761, the entire disclosure of which is incorporated herein by reference.

Typically, microorganisms are prepared for injection by culturing in a nutrient medium appropriate for use in the formation. A method for preparing microorganisms is provided, for example, in U.S. Pat. No. 4,905,761, the entire disclosure of which has been incorporated herein by reference.

Microorganisms can be injected into subterranean formations using methods which are also well known in the art. For example, smaller bacteria (e.g., nutrient starved bacteria) and/or spores can be used in the injection process in order to facilitate the achievement of indepth microorganism distribution. The preferred microorganism injection method will depend upon the microorganism(s) chosen, the specific characteristics of the formation, etc. Examples of useful microorganism injection methods are disclosed, for example, in: U.S. Pat. No. 3,032,472; U.S. Pat. No. 4,800,959; and D.O. Hitzman, *Petroleum Microbiology and the History of Its Role in Enhanced Oil Recovery*, 1982 International Conference on Microbial Enhancement of Oil Recovery, Afton, Oklahoma, May 16-21, U.S.D.0.E. Conf. 8205140, published in 1983, pages 162-218. The entire disclosure of each of these publications is incorporated herein by reference.

Oftentimes, endogenous microorganisms capable of achieving a desired microbial objective are already present within the subterranean formation. The particular endogenous microorganisms existing within a formation can be identified by standard microbiological methods. See, e.g., Manual of Methods for General Bacteriology, American Society of Microbiology, Washington, D.C., 1981; and R.E. Buchanan and N.E. Gibbons, 1974 Bergeys Manual of Determinative Bacteriology, 8th Edition, The Williams and Wilkins Co., Baltimore, Maryland, the entire disclosures of which are incorporated herein by reference. However, for purposes of the present invention, the endogenous microorganisms need not be specifically identified. As shown in the examples provided hereinbelow, samples from the formation can be tested in order to determine whether unidentified microorganisms existing in the formation are capable of achieving a desired microbial objective.

In order to cause the microorganisms within a subterranean formation, whether endogenous or injected, to produce a desired in-situ result, deficient nutrient components are injected into the formation. Deficient nutrient components are those individual nutrient components which are needed by the microorganisms for achievement of a desired microbial objective and which are not already present within the formation in amounts sufficient for achieving the microbial objective. Using samples obtained from the formation, deficient nutrients can be identified using such well known laboratory techniques as atomic absorption spectrophotometry, inductively coupled plasma (ICP), ion chromatography (IC), etc. Deficient nutrients can also be identified using microorganism enrichment culturing techniques such as those provided in Manual of Methods for General Bacteriology, American Society for Microbiology, Washington, D.C. 1981, the entire disclosure of which has been incorporated herein by reference.

Depending on the microorganisms involved, various individual nutrient components may be required in order to sustain microbial activity. Phosphorus containing compounds, nitrogen containing compounds and/or carbon containing compounds are typically required for microbial activity. One or more of these nutrients may be deficient in a given subterranean formation. Other nutrients (e.g. sources of sulfur, trace elements, hydrogen, vitamins, amino acids, nitrates, $CO_2$, etc.) required by particular microorganisms may also be deficient in the formation.

Once the deficient nutrients have been identified, suitable sources of these nutrients are selected for injection into the formation. In the inventive method, nutrient sources are preferably selected such that each nutrient source provides only one deficient nutrient. Preferably, none of the separate nutrient sources contains a complete nutrient medium capable of supporting microbial activity. Thus, for example, if a particular formation is deficient in phosphorus, nitrogen, and carbon nutrients, separate sources of phosphorus, nitrogen, and carbon are preferably selected for injection into the formation.

As is known in the art, the nutrient sources chosen for injection into a subterranean formation should be thermally and chemically stable under the conditions existing in the formation. MEOR processes, for example, are typically conducted in subterranean formations having temperatures in the range of from about 10° C to about 100° C. Additionally, connate water existing within subterranean formations and brines used for forming nutrient injection solutions will often contain high concentrations of salt, alkaline earth ions (e.g., $CA^{+2}$, $Mg^{+2}$, $Ba^{+2}$) and/or heavy metals. Such contaminants will combine with many standard nutrient sources to form insoluble precipitates. Such precipitation removes nutrients from the injected nutrient medium. Additionally, the resulting precipitates can plug the well bore and hinder further microorganism and/or nutrient injection. Thus, as is well known in the art, nutrient sources are preferably chosen which: will not overly precipitate in the formation; will remain stable for extended periods under the temperature and chemical conditions existing within the subterranean formation; and will provide nutrient solutions capable of being transported long distances within the rock matrix of the subterranean formation.

As indicated above, subterranean formations are typically deficient in phosphorus, nitrogen, and/or carbon nutrients. Phosphorus sources (e.g., inorganic and organic phosphates), nitrogen sources (e.g., ammonium-containing compounds such as ammonium chloride, nitrates such as potassium nitrate, and organic nitrogen sources such as amino acids and peptides), carbon sources (e.g., fats, proteins, simple carbohydrates and complex carbohydrates), and other nutrient sources suitable for use in nutrient injection methods are well known in the art. The phosphorus, nitrogen, carbon, and/or other nutrient sources preferred for use in a particular application are determined by the specific microorganisms being used, the characteristics of the formation, the microbial objective sought, etc.

To facilitate injection, the selected nutrient sources should be blended with water to form separate aqueous nutrient solutions. The nutrient sources are typically available in dry powder or liquid concentrate form and can readily be blended with water using methods well known in the art.

The water used for preparing these nutrient solutions can generally be any water available at the well site. For example, fresh water, brine, or salt water can be used. In some instances, the water used will already contain one or more microbial nutrients. If the water already contains one or more microbial nutrients, nutrient sources are preferably selected for use in the inventive method such that none of the solutions formed therefrom contain a complete nutrient medium capable of sustaining microbial activity. As indicated above, the presence of a complete growth medium in a single nutrient source solution can create above-ground contamination and borehole plugging problems.

In the inventive method, the separate aqueous nutrient solutions, each preferably containing a single nutrient source as discussed above, are sequentially injected into the subterranean formation. Each of the nutrient solutions, up to and including the next to the last solution injected, is preferably injected in an amount such that the nutrient source contained therein is retained within the formation in an amount sufficient for achieving the desired microbial objective. Further, nutrient sources are preferably selected for use in the inventive nutrient injection method such that a complete nutrient medium capable of sustaining substantial microbial activity and achieving the desired microbial objective is not formed in the subterranean formation until the last nutrient solution is injected. Consequently, until the last nutrient solution is injected, (1) the nutrient sources contained in the sequentially injected nutrient solutions are not substantially utilized and/or depleted by microorganisms in the vicinity of the borehole and (2) substantial borehole plugging is avoided. Thus, by use of the inventive nutrient injection method, sequentially injected nutrients are readily transported and distributed throughout the subterranean formation.

In the inventive nutrient injection method, the selected nutrient sources are preferably sequentially injected into the formation in order of decreasing quantitative formation retainability. Thus, the nutrient source having the highest quantitative formation retainability is preferably injected first and the nutrient source having the lowest quantitative formation retainability is injected last. Nutrient retention within a subterranean formation can occur, for example, as a result of physical adsorption, chemisorption, precipitation, etc.

The quantitative formation retainability (QFR) of each selected nutrient source can be determined through routine experimentation using core samples. Suitable core samples can be taken from the subterranean formation, from a similar formation, or from Berea core material. The quantitative formation retainability of each nutrient source can be determined, for example, by injecting the nutrient source into a core sample at a given solution concentration and a given velocity. As the nutrient is injected, the nutrient concentration (Co) of the injected solution and the nutrient concentration (C) of the effluent solution are monitored over time until C=Co. The quantitative formation retainability (QFR) of the nutrient source is then determined using the formula QFR=A/P wherein A is the total amount of said nutrient source which has been retained in the core sample when C=Co and P is the pore volume of the core sample.

Following determination of a nutrient source's retention characteristics, it is also helpful, as explained hereinbelow, to examine the nutrient source's desorption characteristics. To determine the nutrient source's desorption characteristics, the retained nutrient is desorbed from the core sample by injecting filter-sterilized field brine. During the desorption process, effluent nutrient concentration is monitored over time.

Sequential injection of the individual nutrient sources in order of decreasing QFR value provides optimum in-depth distribution and retention of the complete growth medium. Since a complete growth medium capable of supporting substantial microbial activity is not formed in the subterranean formation until the last nutrient source is injected, the high QFR value nutrient sources, which are injected first, are not substantially utilized and depleted by subterranean microorganisms during the injection process. Thus, the high QFR value nutrient sources are readily distributed and retained throughout the formation. Additionally, since high QFR value nutrient sources generally have low formation desorption rates, the high QFR value nutrient sources are not significantly removed from the formation during subsequent injection of the lower QFR value nutrient sources.

In addition to the benefits just mentioned, injecting the lowest QFR value nutrient source last further contributes to the attainment of optimum nutrient distribution and retention. As discussed above, a complete nutrient medium capable of supporting substantial microbial activity is formed in the subterranean formation when the last nutrient source is injected. Thus, the last nutrient source will be utilized and depleted by the subterranean microorganisms as it is being injected. However, nutrient sources having low QFR values generally flow through formation rock matrices much more rapidly than do high QFR value nutrient sources. Therefore, when the lowest QFR value nutrient source is injected last, most of said low QFR value nutrient source passes over previously retained nutrients and quickly spreads throughout the formation before being utilized and depleted.

When the inventive nutrient injection method is used in conjunction with an MEOR process, core samples are preferably prepared for nutrient retention testing in the following manner. First, the core sample should be cleaned and then vacuum saturated with filter-sterilized field brine. The core can be cleaned, for example, by methanoltoluene extraction. Sterilized field brine can be obtained by passing field brine through a 0.22μ membrane filter. Second, the core sample should be flooded to immobile water saturation with crude oil which has been filtered and cleaned. Crude oil can be filtered and cleaned, for example, by centrifuging at 20,000 G and $-5°$ C. for from 1 to 1.5 hours and then filtering through a 0.45μ filter. The crude oil used in this step is preferably an oil which has been obtained from the formation being treated. Third, the core should be flooded to residual oil saturation with filter sterilized field brine.

As is well known in the art, the preferred in-situ concentration range of a given nutrient source is determined by the characteristics of the microorganisms being used and the microbial result desired. The optimum in-situ concentration of each nutrient can be determined by independently varying the concentration of the individual nutrient source in a sample core or in an enrichment culture. Typically, desirable in-situ concentrations of phosphorus sources, nitrogen sources, and carbon sources will range from about 1.0 mg/L to several thousand mg/L.

Given the preferred in-situ concentration range and the retention and desorption characteristics of a nutrient source, the optimum injection protocol for the nutrient source (i.e., nutrient solution concentration, solution slug size, slug injection time, etc.) can be determined using methods known in the art. For example, effluent nutrient concentration data obtained in the retention and desorption tests can be correlated with pore volume and then modeled using kinetic expressions, such as those developed by Freundlich or Langmuir, for adsorption isotherms. The resulting model can be used to determine the optimum injection protocol for distributing the nutrient source within the formation and achieving a desired in-situ nutrient concentration.

As mentioned above, subterranean formations are typically deficient in phosphorus, nitrogen, and/or carbon nutrients. Of these nutrients, phosphorus sources will typically have the highest quantitative formation retainability, nitrogen sources will typically have the next highest quantitative formation retainability, and carbon sources will typically have the lowest quantitative formation retainability. Thus, for a formation deficient in phosphorus, nitrogen, and carbon nutrients, it is generally preferred that an aqueous phosphorus source solution is injected first, an aqueous carbon source solution is injected last, and an aqueous nitrogen source solution is injected after the phosphorus source solution and before the carbon source solution.

The inventive nutrient injection method is particularly well suited for use in conjunction with MEOR processes for microbially altering the permeability of subterranean formations which are deficient in phosphorus and carbon nutrients. Since the quantitative formation retainability of phosphorus nutrient sources is typically higher than the quantitative formation retainability of carbon nutrient sources, it is generally preferred that an aqueous phosphorus source solution be injected into the formation first and a separate aqueous carbon source solution be injected last. Preferably, the phosphorus source solution is injected in an amount such that the phosphorus source is retained in the formation in an amount sufficient to support the biomass production necessary to achieve a desired degree of formation permeability alteration. Thus, a nutrient medium capable of sustaining the desired level of biomass production is formed in the subterranean formation upon injection of the aqueous carbon source solution.

If the subterranean formation just described is also deficient in nitrogen nutrients, an aqueous nitrogen source solution is preferably injected into the formation after injection of the phosphorus source solution and prior to injection of the carbon source solution. The nitrogen source solution is preferably injected into the formation in an amount such that the nitrogen source is retained in the formation in an amount sufficient to support the biomass production necessary to achieve the desired degree of formation permeability alteration.

The following examples further illustrate the present invention.

EXAMPLES

The following tests were conducted using core sample plugs from the Burbank field, Osage County, Oklahoma. Each core sample plug was obtained by drilling a 4-inch diameter core sample along its bedding plane using a hollow core bit. Each core sample plug had a 2.54 cm diameter and a length of approximately 7.56 cm. Tapped Ryton end plates were epoxied to the ends of each sample plug and the remainder of the plug was coated with epoxy resin.

The brine used in these tests was obtained from the tank batteries at tracts 5 and 57 of the Burbank field. A chemical analysis of each brine is provided in Table II. T-57 brine was used in Examples I and II while T-5 brine was used in Example III. Since each brine had a high natural nitrogen content, additional nitrogen nutrients were not required.

TABLE II

| Chemical Analysis of Tract 57 Brine and Tract 5 Brine | | |
|---|---|---|
| COMPONENT | T-57 BRINE (mg/L) | T-5 BRINE (mg/L) |
| ammonium | 37 | 33 |
| chloride | 60000 | 66000 |
| sulfate | 10 | 20 |
| TOC[1] | 23 | 25 |
| calcium | 5330 | 6290 |
| barium | 740 | 755 |
| magnesium | 1010 | 1250 |
| sodium | 27000 | 31000 |
| iron | 12.1 | 16.8 |
| TDS[2] | 100000 | 127300 |

[1] Total organic carbon
[2] Total dissolved solids.

All nutrient chemicals used in these tests were reagent grade. Each nutrient solution used in the following tests was prepared by (a) adding an appropriate weight amount of powdered nutrient or nutrient concentrate to unfiltered (i.e., unsterilized) brine; and (b) sterilizing the resulting solution by filtering through a $0.22\mu$ membrane filter. All test procedures were carried out under anaerobic conditions.

EXAMPLE I

A sample plug in its native state (i.e., without cleaning or oil saturation) was vacuum saturated with sterilized (i.e., filtered) T-57 brine. The brine was sterilized by filtering through a $0.22\mu$ membrane filter. Following vacuum saturation, the sample plug was twice sterilized by autoclaving at 121° C. for 35 minutes. The sample plug was then allowed to cool. After cooling, filtered T-57 brine was injected into the sample plug for two hours at a flow rate of 0.38 cc/min. At the end of the two hour injection period, an effluent sample was collected and the bacterial cells contained therein were counted using the Acridine Orange Direct Count (AODC) procedure. $2.8 \times 10^4$ cells/cc were counted in the effluent sample. Some of the cells in the effluent sample were still viable. Thus, for reasons unknown, the core sample sterilization procedure used in this case was not successful.

Following the attempted sterilization procedure, the core plug was determined to have a porosity of 0.25, a pore volume of 5.10 cc, and a specific permeability to nitrogen of 1054 mD.

Bacterial cells were introduced into the sample plug by flooding the plug with 31.5 pore volumes (PV) of unfiltered T-57 brine. After inoculation, 125 pore volumes of a 0.4 percent by weight glucose solution were injected into the plug over a period of seven days. At the end of the seven day period, effluent analysis indicated that the the glucose concentration and pH values of the effluent were the same as the glucose concentration and pH values of the injected solution. Additionally, the effluent cell count had increased to only $4.9 \times 10^4$ cells/cc. As a result of the seven day glucose injection, the permeability of the sample plug, as indicated by the change in pressure differential across the plug, had declined by only 18 percent.

The glucose solution was flushed from the sample plug using unfiltered T-57 brine. Next, one pore volume of a 306 mg/L trisodium trimetaphosphate solution was injected into the plug. Following injection, unadsorbed trisodium trimetaphosphate was flushed from the sample plug using one pore volume of filtered T-57 brine. Injection of the trisodium trimetaphosphate solution resulted in a slight increase in permeability.

71.5 pore volumes of a 0.4 weight percent glucose solution were then injected into the sample plug over a period of approximately four days. After one day of injection, effluent analysis indicated that 6 percent of the injected glucose was being utilized in the sample plug. At the end of the fourth day, 13 percent of the injected glucose was being utilized in the sample plug. Effluent samples taken at the beginning and at the end of the four day injection period also indicated that the pH of the effluent had dropped from an initial value of 6.1 to a value of 5.1 at the end of the injection period. Such nutrient utilization and pH characteristics are indicative of microbial activity within the sample plug. By the end of the four day glucose injection period the permeability of the sample plug had declined by an amount in the range of from 64 to 89 percent. The precise amount of permeability reduction within this range could not be determined due to pressure fluctuations resulting from pump pulsation.

These results demonstrate the desirability of adding nutrient sources in order of decreasing retention rate. Typically, glucose is weakly adsorbed on the rock formation matrix. Thus, very little of the initially injected glucose remained in the sample plug after flushing. However, retention of the strongly adsorbing phosphate nutrient was quite good, even though only one pore volume of phosphate solution was used.

EXAMPLE II

The sample plug used in this test was cleaned in a Soxhlet extractor using toluene and methanol. The sample plug was then vacuum saturated with filtered T-57 brine. Following vacuum saturation, the sample plug was determined to have a porosity of 0.38, a pore volume of 4.90 cc and a permeability of 518 mD. The sample plug was subsequently flooded with filtered Burbank oil and then flooded to residual oil saturation using filtered T-57 brine.

After the sample plug was flooded to residual oil saturation, the sample plug was inoculated with bacterial cells by flooding with 31.5 PV of unfiltered T-57 brine. Following bacterial cell inoculation, the permeability of the sample plug declined by 20 percent.

After inoculation, one pore volume of a 368 mg/L solution of pentasodium tripolyphosphate was injected into the sample plug. Unadsorbed pentasodium tripolyphosphate was flushed from the sample plug using one pore volume of filtered T-57 brine. 220.6 pore volumes of a 0.4 weight percent glucose solution were then injected into the sample plug over a period of seven days. At the end of the seven day glucose injection, the permeability of the sample plug had declined by a factor of greater than 200 (i.e., the pressure drop across the plug at the end of the seven day glucose injection was over 200 times higher than the pressure drop across the plug at the beginning of the seven day glucose injection). Effluent samples taken at the end of the seven day period indicated that from three to six percent of the injected glucose was still being used in the sample plug.

Following glucose injection, the residual resistance of the biomass formed within the sample plug was tested by flooding the sample plug with 378 PV of filtered T-57 brine over a period of 12 days. At the end of the 12 day flooding period, the permeability of the sample plug had increased over tenfold. However, the permeability of the sample plug was still more than 90 percent less than the permeability of the sample plug immediately following inoculation.

An additional 1 PV slug of phosphate solution was then injected into the sample plug. Non-adsorbed phosphate was again flushed from the sample plug using one pore volume of filtered T-57 brine. 220.6 pore volumes of 0.4 weight percent glucose solution were then pumped through the sample plug over a period of seven days. At the end of this seven day glucose injection period, the permeability of the sample plug was 95% lower than immediately following inoculation and from eight to ten percent of the injected glucose was being used in the sample plug.

EXAMPLE III

The sample plug used in this test was prepared for testing in the manner set forth in Example II. However, T-5 brine was used rather than T-57 brine. The sample plug had a porosity of 0.39, a pore volume of 4.97 cc, and a permeability of 389 mD.

After the sample plug was flooded to residual oil saturation, the plug was inoculated by injecting 86.1 PV of unfiltered T-5 brine. Following inoculation, one PV of a 306 mg/L solution of trisodium trimetaphosphate was injected into the plug. Unadsorbed phosphate was flushed from the plug using one PV of filtered T-5 brine. Subsequently, 660 pore volumes of a 4 g/L glucose solution were injected into the plug over a period of 23 days. At the end of the 23 day injection period, the permeability of the sample plug had decreased by a factor of 20.

Following glucose injection, the residual resistance of the biomass formed within the sample plug was tested by injecting 56 pore volumes of filtered T-5 brine over a period of 46.5 hours. At the end of the 46.5 hour injection period, the permeability of the sample plug was only 29% greater than determined following glucose injection.

In order to determine the extent to which the permeability reduction achieved in this test resulted from face plugging, the sample plug was backflushed with three 1.2 PV slugs of filtered T-5 brine. The first slug was pumped through the plug at a velocity of 0.93 ft/day and the second and third slugs were each pumped through the plug at a velocity of 36.4 ft/day. Based on the permeability of the sample plug following the residual resistance test, the first backflush increased the permeability of the sample plug by 22%, the second backflush increased the permeability of the sample plug by an additional 54%, and the third backflush provided no significant permeability increase. Thus, less than 46% of the total permeability reduction achieved using the nutrient injection procedure of this test resulted from face plugging.

Examples I, II, and III each demonstrate the effectiveness of the inventive nutrient injection method. The examples show that sequential nutrient injection can be used to form a complete in-situ growth medium. Additionally, the Examples illustrate (a) the desirability of injecting nutrients in order of decreasing quantitative formation retainability and (b) the effectiveness of the inventive method for achieving in-depth nutrient distribution.

Thus, the present invention is well adapted to carry out the objects and attain the ends and advantages mentioned above as well as those inherent therein. While presently preferred embodiments have been described for purposes of this disclosure, numerous changes can be made by those skilled in the art. Such changes are encompassed within the spirit of this invention as defined by the appended claims.

What is claimed is:

1. A method of injecting microbial nutrients into a subterranean formation for achieving a desired in-situ microbial objective comprising the step of sequentially injecting, in order of decreasing quantitative formation retainability, sources of individual nutrient components which are deficient in said subterranean formation into said subterranean formation so that a complete nutrient medium capable of sustaining substantial microbial activity is formed in said subterranean formation upon injection of the last of said sources, each of said sources comprising at least one of said individual nutrient components and each of said sources, up to and including the next to the last of said sources injected, being injected in an amount such that the at least one individual nutrient component contained therein is retained in said subterranean formation in an amount sufficient for achieving said desired in-situ microbial objective.

2. The method of claim 1 further comprising the step of determining the quantitative formation retainabilities of said sources.

3. The method of claim 1 wherein said desired in-situ microbial objective is accomplished using microorganisms which are endogenous to said subterranean formation.

4. The method of claim 1 wherein said desired in-situ microbial objective is accomplished using microorganisms which have been injected into said subterranean formation.

5. A method of injecting microbial nutrients into a subterranean formation for achieving a desired in-situ microbial objective comprising the step of sequentially injecting sources of individual nutrient components which are deficient in said subterranean formation into said subterranean formation in order of decreasing quantitative formation retainability.

6. The method of claim 5 wherein a complete nutrient medium capable of sustaining substantial microbial activity is formed inn said subterranean formation upon injection of the last of said sources.

7. The method of claim 5 wherein each of said sources comprises at least one of said individual nutrient components which are deficient in said formation and each of said sources, up to and including the next to the last of said sources injected, is injected in an amount such that the at least one individual nutrient component contained therein is retained in said subterranean formation in an amount sufficient for achieving said desired in-situ microbial objective.

8. The method of claim 5 further comprising the step of determining the quantitative formation retainabilities of said sources.

9. The method of claim 5 wherein said sources are injected into said subterranean formation in the form of source solutions, none of said source solutions containing a complete growth medium capable of sustaining substantial above-ground microbial activity.

10. The method of claim 5 wherein said subterranean formation is an oil-bearing subterranean formation.

11. The method of claim 10 wherein said desired microbial objective is the alteration of the permeability of said subterranean formation.

12. A method of injecting microbial nutrients into an oil bearing subterranean formation for achieving a desired insitu microbial objective comprising the step of sequentially injecting, in order of decreasing quantitative formation retainability, sources of individual nutrient components which are deficient in said subterranean formation into said subterranean formation so that a complete nutrient medium capable of sustaining substantial microbial activity is formed in said subterranean formation upon injection of the last of said sources, each of said sources comprising at least one of said individual nutrient components and each of said sources, up to and including the next to the last of said sources injected, being injected in an amount such that the at least one individual nutrient component contained therein is retained in said subterranean formation in an amount sufficient for achieving said microbial desired objective.

13. The method of claim 12 further comprising the step of determining the quantitative formation retainabilities of said sources.

14. The method of claim 12 wherein said desired microbial objective is achieved using microorganisms which are endogenous to said subterranean formation.

15. The method of claim 12 wherein said desired microbial objective is achieved using microorganisms which have been injected into said subterranean formation.

16. The method of claim 12 wherein said desired microbial objective is the alteration of the permeability of said subterranean formation.

17. A method of injecting microbial nutrients into an oil bearing subterranean formation inn order to microbially alter the permeability of said subterranean formation comprising the step of sequentially injecting, in order of decreasing quantitative formation retainability, sources of individual nutrient components which are deficient inn said subterranean formation into said subterranean formation so that a complete nutrient medium capable of supporting substantial microbial activity is formed in said subterranean formation upon injection of the last of said sources, each of said sources comprising at least one of said individual nutrient components and each of said sources, up to and including the next to the last of said sources injected, being injected in an amount such that the at least one individual nutrient component contained therein is retained in said subterranean formation in an amount sufficient for achieving a desired degree of formation permeability alteration.

18. The method of claim 17 further comprising the step of determining the quantitative formation retainabilities of said sources.

19. The method of claim 16 wherein said formation permeability alteration is accommplished using microorganisms which are endogenous to said subterranean formation.

20. A method of injecting microbial nutrients into an oil bearing subterranean formation which is deficient in phosphorus and carbon nutrients in order to microbially alter the permeability of said subterranean formation comprising the steps of:

injecting a first nutrient solution comprising a phosphorus nutrient source into said subterranean formation, said first nutrient solution being injected into said subterranean formation in an amount such that said phosphorus nutrient source is retained in said subterranean formation in an amount sufficient for achieving a desired degree of formation permeability alteration, said first nutrient solution being a substantially carbon nutrient-free solution; and (b) then, injecting a second nutrient solution comprising a carbon nutrient source into said subterranean formation, said second nutrient solution being a substantially phosphorus nutrient-free solution.

21. The method of claim 20 wherein said subterranean formation is also deficient in nitrogen nutrients and a third nutrient solution comprising a nitrogen nutrient source is injected into said subterranean formation after step (a) and prior to step (b) in an amount such that said nitrogen nutrient source is retained in said subterranean formation in an amount sufficient for achieving said desired degree of formation permeability alternation, said third nutrient solution being a substantially phosphorus nutrient-free and substantially carbon nutrient-free solution, said first nutrient solution being a substantially nitrogen nutrient-free solution, and said second nutrient solution being a substantially nitrogen nutrient-free solution.

22. The method of claim 21 wherein substantially no nitrogen nutrients are injected into said subterranean formation until after step (a) and wherein substantially no carbon nutrients are injected into said subterranean formation until step (b).

23. The method of claim 20 wherein said formation permeability alteration is achieved using microorganisms which are endogenous to said subterranean formation.

24. The method of claim 20 wherein substantially no carbon nutrients are injected into said subterranean formation until step (b).

* * * * *

UNITED STATES PATENT AND TRADEMARK OFFICE
CERTIFICATE OF CORRECTION

PATENT NO. : 5,083,611

DATED : January 28, 1992

INVENTOR(S) : James B. Clark and Gary E. Jenneman

It is certified that error appears in the above-identified patent and that said Letters Patent is hereby corrected as shown below:

<u>IN THE CLAIMS</u>

Col. 12, claim 6, line 25, change "inn" to --in--;

Col. 13, claim 17, line 12, change "inn" to --in--;

Col. 13, claim 17, line 17, change "inn" to --in--; and

Col. 13, claim 19, line 33, change "accommplished" to --accomplished--.

Signed and Sealed this

Twentieth Day of April, 1993

*Attest:*

MICHAEL K. KIRK

*Attesting Officer*      *Acting Commissioner of Patents and Trademarks*